US008573156B2

(12) United States Patent
Gates

(10) Patent No.: US 8,573,156 B2
(45) Date of Patent: Nov. 5, 2013

(54) DUAL HOPPER ANIMAL FEEDER DEVICE

(75) Inventor: Burnell Gates, San Antonio, TX (US)

(73) Assignee: All Seasons Feeders, Inc., San Antonio, TX (US)

( * ) Notice: Subject to any disclaimer, the term of this patent is extended or adjusted under 35 U.S.C. 154(b) by 672 days.

(21) Appl. No.: 12/728,679

(22) Filed: Mar. 22, 2010

(65) Prior Publication Data

US 2010/0307421 A1 Dec. 9, 2010

Related U.S. Application Data

(60) Provisional application No. 61/184,571, filed on Jun. 5, 2009.

(51) Int. Cl.
*A01K 1/10* (2006.01)

(52) U.S. Cl.
USPC .......................................... 119/53; 119/52.1

(58) Field of Classification Search
USPC .............. 119/51.5, 51.01, 51.11, 52.1, 52.2, 119/57.1, 57.8, 57.91, 51.13; 222/144.5, 222/559, 561, 133, 135, 142.5
See application file for complete search history.

(56) References Cited

U.S. PATENT DOCUMENTS

| | | | | |
|---|---|---|---|---|
| 1,021,209 A | * | 3/1912 | Platt | 119/51.5 |
| 1,614,394 A | * | 1/1927 | Robison | 119/51.5 |
| 2,283,230 A | * | 5/1942 | Rogers | 222/131 |
| 2,527,324 A | * | 10/1950 | Muehlfeld | 119/51.5 |
| 2,583,218 A | * | 1/1952 | Lambeth | 119/51.5 |
| 2,934,037 A | * | 4/1960 | Ernest | 119/56.1 |
| 2,994,460 A | * | 8/1961 | Matthews | 222/129 |
| 3,186,689 A | * | 6/1965 | Davies | 366/193 |
| 3,441,224 A | * | 4/1969 | Barth et al. | 239/656 |
| 3,497,109 A | * | 2/1970 | Leach | 222/144.5 |
| 3,587,936 A | * | 6/1971 | Riotto | 22/196 |
| 3,664,642 A | * | 5/1972 | Morin | 366/181.1 |
| 3,962,997 A | | 6/1976 | Ruth | |
| 4,030,633 A | * | 6/1977 | Fisher | 222/1 |
| 4,136,804 A | * | 1/1979 | Kinzler et al. | 222/547 |
| 4,176,767 A | * | 12/1979 | Franche, IV | 222/243 |
| 4,523,547 A | * | 6/1985 | Ogasawara et al. | 119/57.6 |
| 4,548,342 A | * | 10/1985 | Fisher | 222/145.8 |
| 4,582,023 A | | 4/1986 | Zumbahlen et al. | |
| 4,609,151 A | * | 9/1986 | Crowley | 239/656 |
| 4,693,355 A | * | 9/1987 | Bochi et al. | 193/2 R |
| 4,986,220 A | | 1/1991 | Renear et al. | |
| 5,066,388 A | | 11/1991 | Ross | |

(Continued)

*Primary Examiner* — Monica Williams
*Assistant Examiner* — Joshua Huson
(74) *Attorney, Agent, or Firm* — Jackson Walker, LLP

(57) ABSTRACT

An animal feeding device for feeding animals, including wildlife, is disclosed. The animal feeding device includes a first storage compartment and a second storage compartment inside the first storage compartment. Both storage compartments have openings on the upper ends thereof. The first and second storage compartments have feed assemblies engaged to the lower end thereof, to provide a first feed from a first storage compartment to a first feed assembly, and a second feed from a second storage compartment to a second feed assembly. In this manner, two different types of feed may be poured into one device, but kept separate, a first feed, for example, in a first storage compartment, and a second feed in a second storage compartment. Moreover, a first and second feeding assembly can be engaged with the first or second storage means and below the first and second storage means to gravity feed the first feed to the first feed assembly and the second feed to the second feed assembly. By having two different feeds kept separate, two different types of animals can be fed.

3 Claims, 8 Drawing Sheets

(56) References Cited

U.S. PATENT DOCUMENTS

| | | | |
|---|---|---|---|
| 5,069,164 A | 12/1991 | Wiwi | |
| 5,080,259 A * | 1/1992 | Hadley | 222/83.5 |
| 5,143,289 A | 9/1992 | Gresham et al. | |
| 5,333,572 A | 8/1994 | Nutt | |
| 5,503,090 A | 4/1996 | Guzan | |
| 5,855,943 A | 1/1999 | Lush et al. | |
| 6,199,509 B1 | 3/2001 | Mostyn et al. | |
| 6,318,290 B1 * | 11/2001 | Fisher | 119/51.5 |
| 6,510,813 B1 | 1/2003 | Boone, Jr. | |
| 6,722,311 B1 | 4/2004 | Sides et al. | |
| 6,845,890 B2 * | 1/2005 | Johanson | 222/459 |
| 6,899,056 B1 | 5/2005 | Kelly | |
| 6,920,841 B2 | 7/2005 | Meritt | |
| 7,222,583 B2 | 5/2007 | Foster et al. | |
| 7,370,605 B2 | 5/2008 | Meritt | |
| 7,918,184 B2 * | 4/2011 | Humphries et al. | 119/51.5 |
| 7,954,454 B2 * | 6/2011 | Lewis | 119/57.91 |
| 2005/0076843 A1 * | 4/2005 | Ansaldo | 119/57.91 |
| 2006/0048712 A1 | 3/2006 | Boyer | |
| 2006/0283396 A1 | 12/2006 | Hernandez | |
| 2008/0029546 A1 * | 2/2008 | Schuld | 222/185.1 |
| 2008/0257270 A1 | 10/2008 | Stankard et al. | |
| 2008/0277423 A1 * | 11/2008 | Garton | 222/185.1 |
| 2008/0302305 A1 * | 12/2008 | Beaudoin et al. | 119/51.12 |
| 2009/0032555 A1 * | 2/2009 | Peterson | 222/226 |
| 2009/0120369 A1 | 5/2009 | Lewis | |
| 2009/0173282 A1 * | 7/2009 | Wu et al. | 119/51.02 |
| 2009/0199773 A1 * | 8/2009 | Jurk | 119/57.91 |
| 2009/0241845 A1 * | 10/2009 | Croft | 119/51.11 |

* cited by examiner

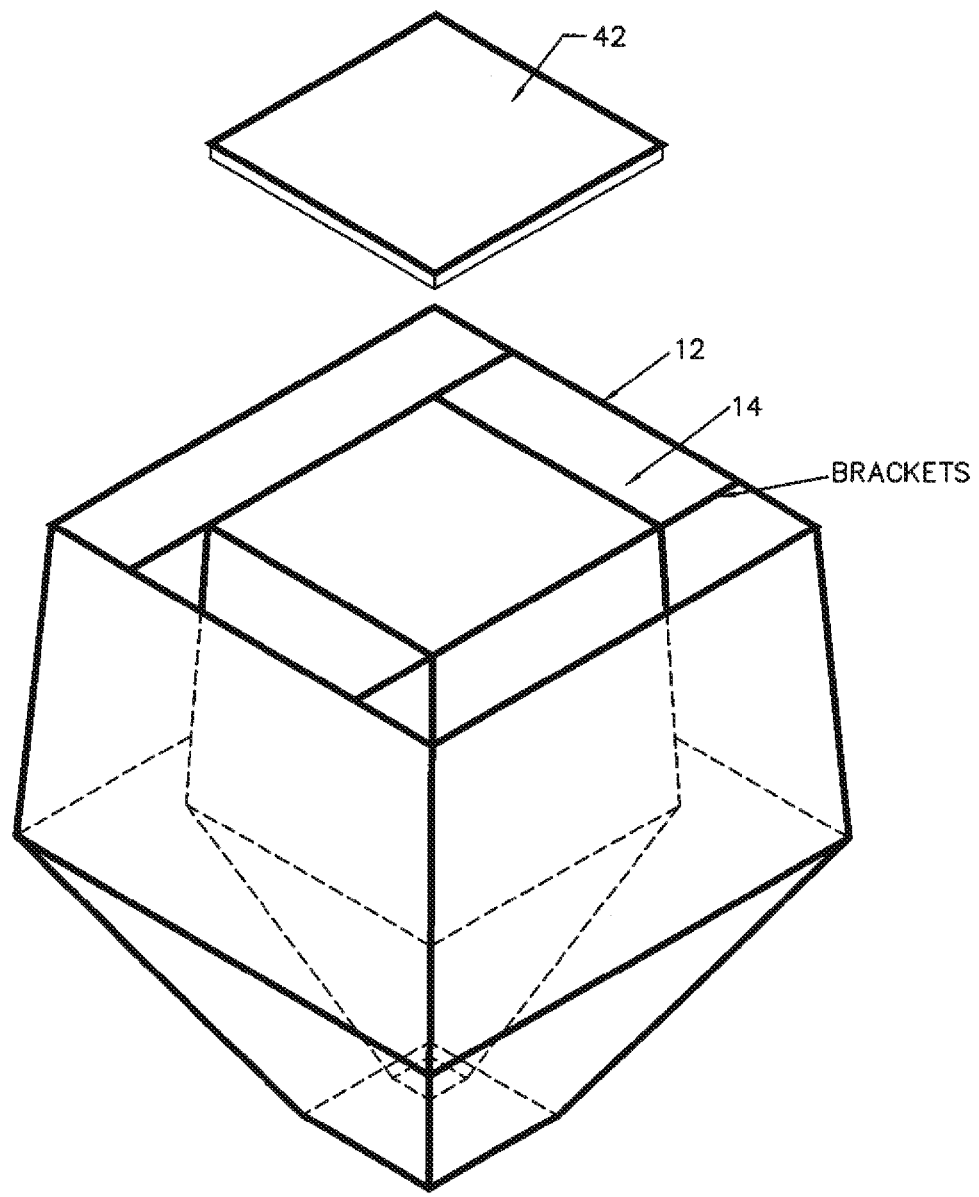
FIG.—1A

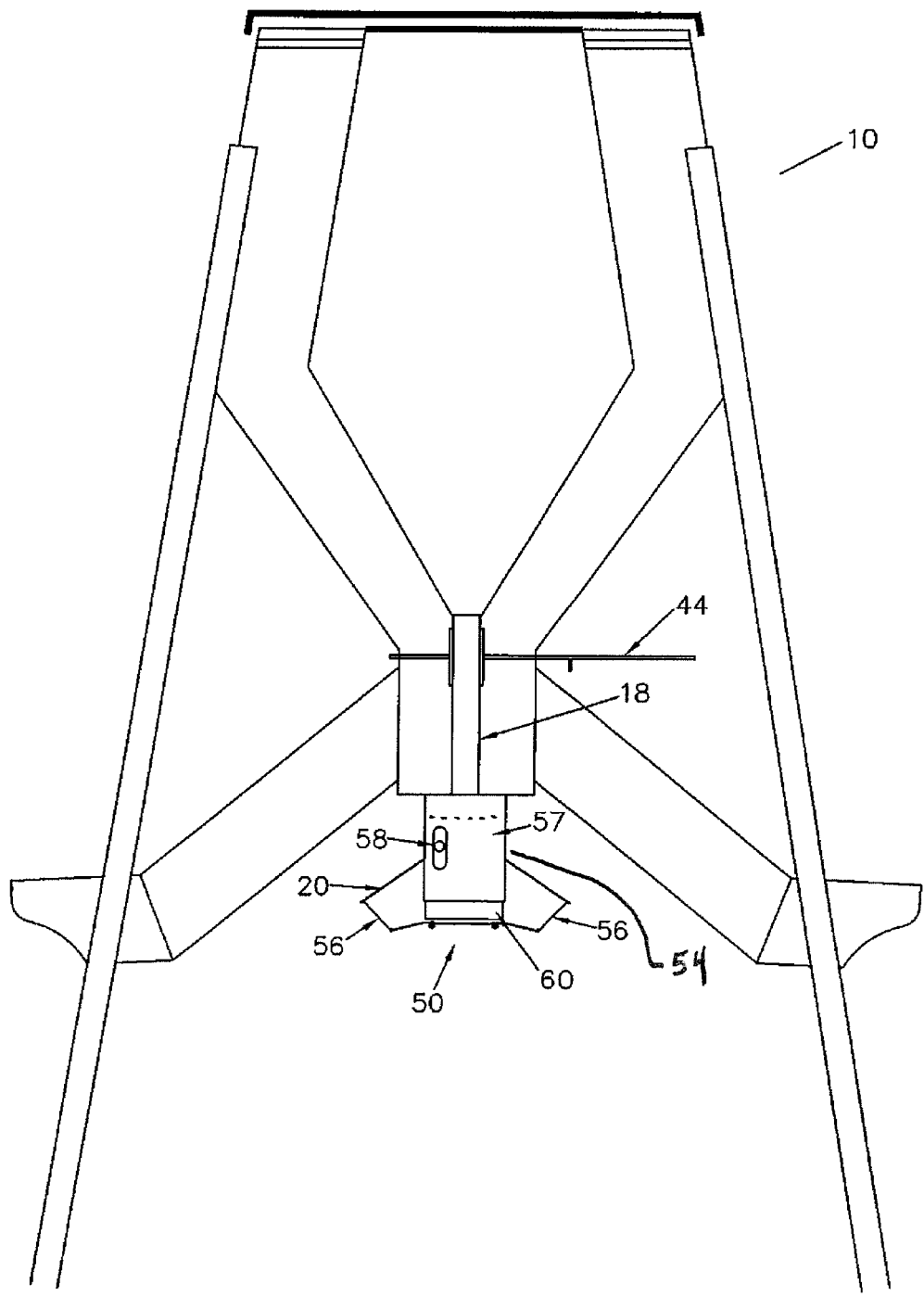
FIG.—3B

THREE STAGE GATE
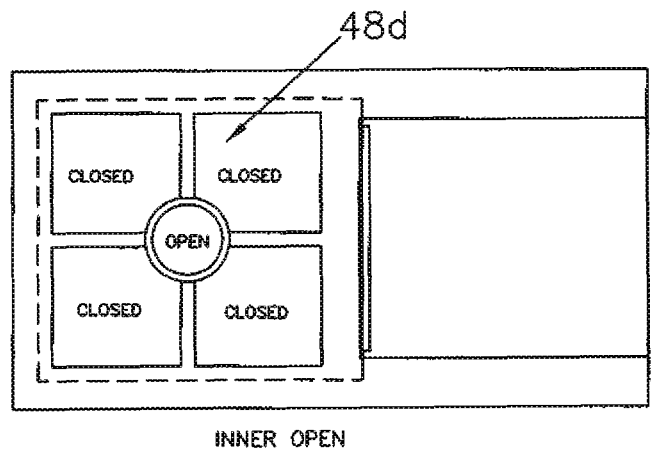
FIG.—4a
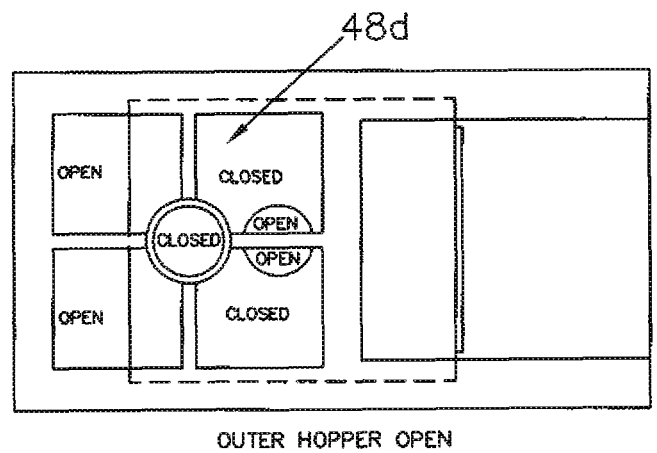
FIG.—4b
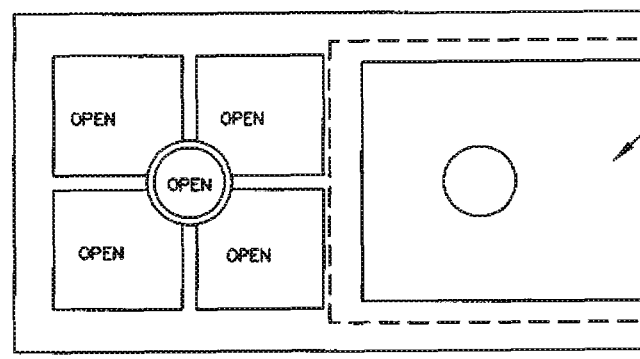
FIG.—4c

DUAL HOPPER ANIMAL FEEDER DEVICE

This is a utility patent application claiming priority from and the benefit of and incorporating U.S. Provisional Application Ser. No. 61/184,571, filed Jun. 5, 2009.

FIELD OF THE INVENTION

Feeders, including feeders for wildlife, more particularly, a dual hopper wildlife feeder capable of maintaining and dispensing two separately different animal feeds therefrom.

BACKGROUND OF THE INVENTION

Animal feeders, including wildlife feeders, are known in the prior art to dispense feed to domestic animals, such as cattle, or wildlife, such as deer.

These prior art animal feeders are typically either passive or active. A passive feeder is one that does not use a motor. An active feeder uses a motor to cast feed from a hopper onto the ground. Active wildlife feeders usually include a control unit having a timer and are battery powered, the battery driving the electric motor. The timer is set to dispense the feed at regular intervals. The wildlife learn these intervals and will tend to aggregate at the wildlife feeder at those times. For example, the wildlife may be trained by a feeder activated about sunset to aggregate at the feeder area about sunset.

In a passive wildlife feeder, the feed is fed from a hopper into a feed trough and the geometry of the feeder is such that the feed lays adjacent a trough opening. An animal will eat the food from the mouth of the food trough. As the food is eaten, gravity feed will allow more to enter the feed trough. Such a feed mechanism is entirely passive, depending as it does on the impetus of gravity to allow the granular feed to continue to move into the feed trough as the animal eats from the end of the trough.

Moreover prior art animal feeders are typically designed to accept a single type of food, for example, either corn or protein, for dispensing either actively or passively. Prior art animal feeders are designed to supply feed, from a single hopper, to one or more troughs (passive) or from a single hopper onto a disk for active dispensing therefrom. If a user requires two different food substances to be provided in the same area, two separate animal feeders are typically required or one has to be used up and then a second different supply of feed provided therein.

OBJECTS OF THE INVENTION

It is an object of Applicant's present invention to provide a device wherein a single unit may provide two different types of feed substances, for example, corn and protein, to be separately dispensed therefrom.

It is a further object of Applicant's present device in a first embodiment to provide for both passive distribution of a first feed and an active distribution of a second feed in a single animal feeder.

It is another object of Applicant's present device, in a second embodiment, to provide for the passive dispensing of two different food substances from the same feeder and keeping both food substances segregated from one another.

It is another object of the present invention to provide for a controlled dispensing of particulate food matter into either or both of passive and active dispensing means.

SUMMARY OF THE INVENTION

Applicant provides, in a first embodiment, a food storage means, typically capable of storing two different food substances in isolation from one another, which food storage device has a first and a second compartment. Typically, both compartments gravity feed into separate throats. Typically, a first throat is in fluid communication with the first compartment and in fluid communication with a multiplicity of feed troughs for passive dispensing of the first food substance. The second compartment is in fluid communication with a second throat. At the removed end of the second throat and/or just below the removed end of the second throat is located a broadcast assembly which includes a spinner plate, a motor, and a timer. The spinner plate receives particulate matter of a second feed type thereupon and periodically is energized to fling the particulate matter radially outward from a housing located below the throat.

In a second embodiment, Applicant provides a device wherein a first and a second hopper, capable of receiving a first and a second feed type, is in fluid communication with a first and a second throat. The first and the second throats separably engage a first and a second feed trough assembly, typically spaced apart either vertically or laterally, to dispense separately a first and second feed type therefrom.

BRIEF DESCRIPTION OF THE DRAWINGS

FIG. 1A is an illustration in perspective of the two hoppers, one inside the other, and a lid fitting the inner hopper.

FIGS. 3, 3A, 3B, and 3C are side elevational views of a second embodiment of Applicant's novel device which passively dispenses a first feed and passive dispenses, separately, a second feed therefrom.

FIGS. 4A-4C illustrate an embodiment of a gate for use with the novel animal feeder.

DETAILED DESCRIPTION OF THE PREFERRED EMBODIMENT

Figure 1:
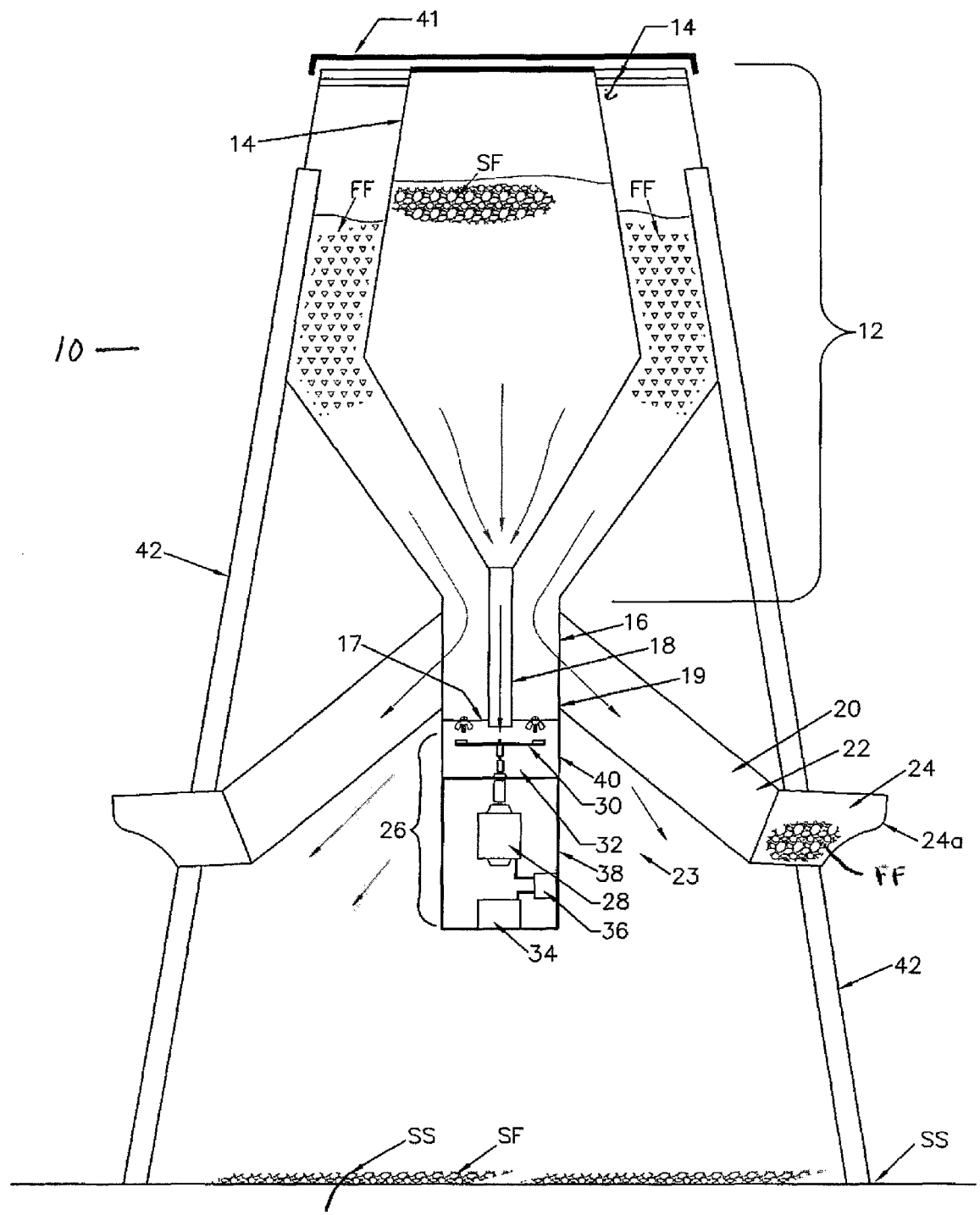
FIG. 1 is a side elevational view cutaway of a first embodiment of Applicant's novel device providing for a first feed and a second feed to be separately dispensed from the same feeder, wherein the first feed is dispensed passively and the second feed is dispensed actively from a spinner assembly.

Turning now to FIG. 1, it is seen that Applicant provides a combination passive and active animal feeder device 10 which separately provides a first feed FF passively to an animal and a second feed SF actively thrown to the ground. For passive dispensing, an animal would obtain first feed FF from a passive feed chute 20 as illustrated and for obtaining the second feed SF will eat the second food once actively dispensed directly from a support surface SS, such as the ground on which the animal feeder device 10 rests.

FIG. 1 illustrates animal feeder device 10 having walls defining an outer hopper 12 and walls defining an inner hopper 14. Both hoppers 12/14 are typically either rectangular or cylindrical, the inner inside the outer, and typically include funnel shaped walls at the lower end thereof for directing particulate matter to separate throats. Outer hopper throat 16 is provided for receiving a first feed FF from the outer hopper and inner hopper throat 18 is provided for receiving a second feed SF from inner hopper 14. As seen from the illustrations, the hoppers and throats are usually dimensioned for the inner to fit inside the outer. That is to say, the outer hopper 12 is dimensioned to substantially receive the inner hopper 14 therein. The first feed FF is seen to reside in the outer hopper 12, which is that area between the walls defining the outer hopper 12 and the walls defining the inner hopper 14. Likewise, outer hopper throat 16 may be cylindrical and/or rectangular or any other suitable shape and engaged to the funnel shaped lower end of outer hopper 12, which throat 16 is typically generally vertical and receives feed, here FF, from the outer hopper under the impetus of gravity.

Inner throat 18 is provided in fluid communication with the funnel shaped lower walls of inner hopper 14 to receive particulate feed, here SF, from the inner hopper under the impetus of gravity and in a manner so as to direct the feed typically vertically downward to an opening at the lower end of the inner hopper throat 18.

Turning back to the passive feed system portion of animal feeder device 10, it is seen to be comprised of an outer hopper and (optionally) an outer throat, the outer hopper and outer throat being adapted to physically keep separate a first feed FF from a second feed SF and to provide, under the impetus of gravity, a flow of the first feed into a passive feed chute 20. Passive feed chute 20 may be cylindrical or rectangular or any other suitable shape and typically includes an inclined member 22 as an upper portion thereof. Two or more feed chutes may comprise a first passive feed assembly 21. Passive feed chute 20 typically includes a generally horizontally trending member 24, or a member that is almost horizontal, which may include a cutaway section 24a (see in profile in FIG. 1) allowing an animal to place his muzzle in the opening to receive the feed flowing under gravity and accumulating at the bottom of incline member 22 at or on horizontal member 24 near the removed end thereof.

Horizontal member 24 is typically fairly short and the opening is large enough to allow easy access from the muzzle of an animal. The passive feed chute may include a baffle assembly, which baffle assembly has a rigid wall and adjustable leaves. The rigid wall serves to mount the leaves and may, along with the leaves, help stop particulate feed from flowing out of the mouth onto the ground.

However, a second feed assembly 23 is included in Applicant's animal feeder device 10, which second feed assembly 23 includes at least inner hopper 14 and inner hopper throat 18 for separately maintaining a second feed SF from the first feed FF, and for dispensing second feed out of a lower end of inner hopper throat 18 onto, in one embodiment, a broadcast assembly 26, which includes spinner plate 30. Spinner plate, upon receiving a particulate feed, will from time to time, powered by electric motor 28, spin. Spinning the spinner plate 30 with second feed SF thereon will, under centrifugal force, throw the second feed outward through openings or windows on broadcast assembly 26 and onto a support surface SS, such as the ground. Animals will then be able to eat the second food substance directly off the ground.

The broadcast assembly is seen to function in ways known in the art, by engaging electric motor 28 to a spinner plate 30. This engagement is typically through a drive member 32. A battery 34 is provided, which battery is typically engaged with a controller/timer 36 to be set by the user and to control the time at which the motor is activated and deactivated. A first housing 38 may be used to enclose or at least partially enclose some of the elements of the broadcast assembly, for example, here motor 28, battery 34, and controller/timer 36. Second housing 40 may have a multiplicity of window openings therein adjacent and in the plane of the spinner plate and be provided to engage the lower end of animal feeder device 10 and to place the spinner plate 30 below the open lower end of inner hopper throat 18 in the manner illustrated.

A single lid 40 may be provided to cover both the upper open ends of walls defining outer hopper 12 and walls defining inner hopper 14 to prevent weather, or precipitation from spoiling the feed within the two hoppers. A second, typically smaller, lid 42a may be provided for covering the upper opening of the inner hopper (see FIG. 1A). This second lid 42a may help prevent feed from inadvertently falling into the inner hopper when the outer hopper is being filled. Legs 42 are provided as known in the art. These legs are intended to hold both the first and second feed assemblies off the support surface.

FIG. 1 also illustrates the manner wherein a cleanout plate 17 is provided at or near the end or base of outer hopper throat 16. Cleanout plate 17 may be held in place by a tab and fastener assembly 19. Tab and fastener assembly 19 may have captive bolt heads of fasteners rigidly attached to a metal tab extending inward from the throat and the outer hopper plate may have holes therein so it may drop down when the nuts of the removed end of the fastener are released. This will allow the cleanout of any feed accumulating on the plates that does not fall into the gate inclined members.

Figures 2, 2A:
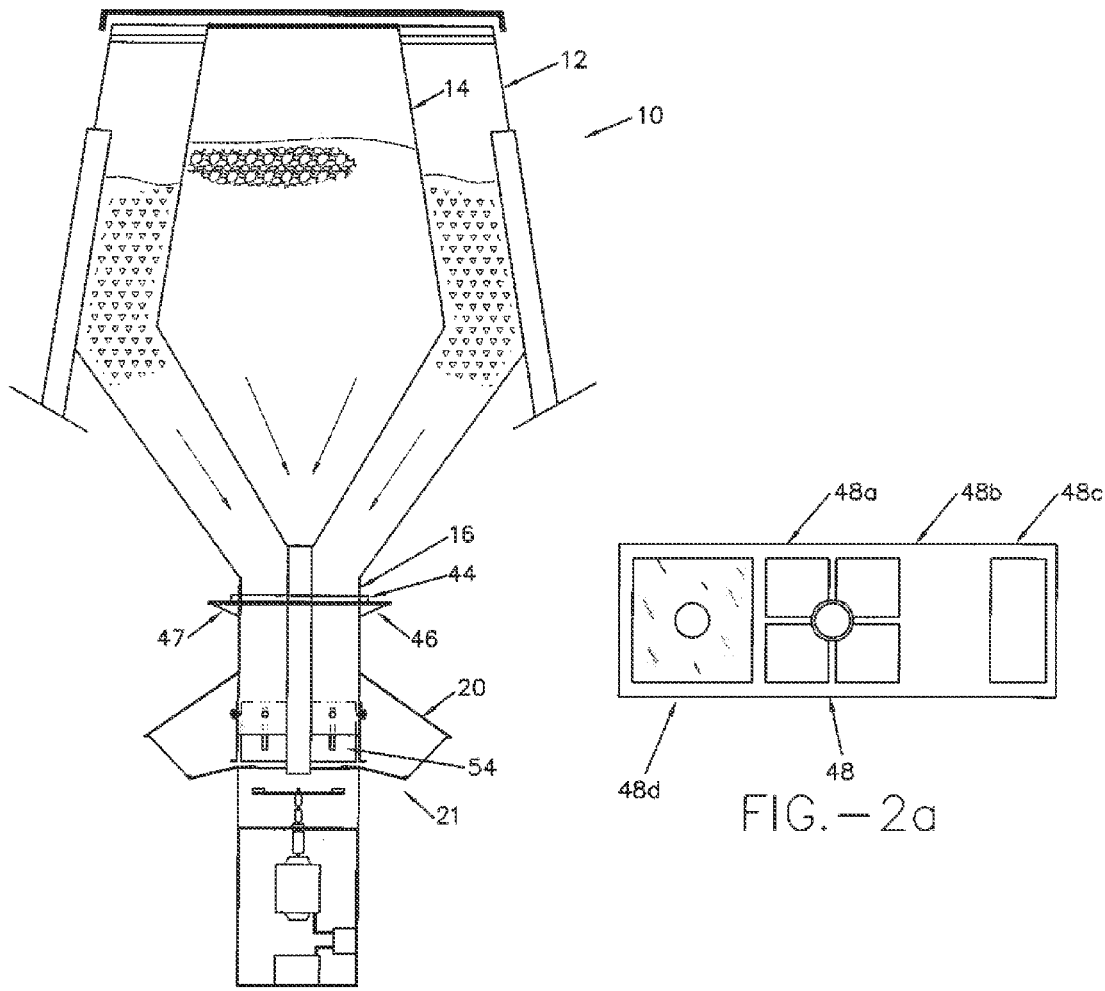
FIG. 2 is a side elevational view cutaway to show additional details of a first embodiment of Applicant's novel animal feeder device capable of both passive feeding of a first food substance and an active feeding of a second particulate food substance.
FIG. 2A illustrates a flow control assembly.

Turning to FIGS. 2 and 2A, it is seen that a flow control assembly 44 may be provided for any of the devices described therein, which is intended to control the flow of the first feed and/or second feed through the animal feeder. That is to say, it may be desirable to operate, for example, during a certain season or at a selected time, only dispensing from the first feeder assembly and not from the second. At other times, it may be desirable to dispense from the other, both or neither. For providing controlled feed flow of first feed and second feed through the animal feeder, flow control assembly 44 is provided. Flow control assembly 44 typically includes a horizontally trending slot 46, including rails 47 thereon. Slot and rails are provided to maintain and align a typically vertical plate or gate 48 for receipt therein, which gate may be moved horizontally to the left or right to selectively occlude some, none or all of the first and/or second throats. Vertical flow plate or gate 48 is dimensioned to be received within the slot to control generally vertical flow of feed. The slot intersects the throats.

There may be three sections or portions on the plate 48a/48b/48d, as well as a handle 48c to manually slide the gate horizontally (as seen in FIG. 2) in slot 46. Section or portion 48a may be placed directly within outer hopper 16, so that the circular central portion thereof is located to substantially block inner hopper throat 18. As is seen from the construction of portion 48a, when the central portion blocks the inner hopper throat, flow is still provided through the outer hopper throat 16 to the passive feed chutes 20. On the other hand, plate 48a may be shifted slightly to one side or to the other to move the central portion either partially or fully out of occlusion with inner hopper throat 18, and therefore allow some feed to flow through both throats. That is to say, portion 48a is typically provided to either fully or partially occlude and control flow through inner hopper throat 18 while allowing flow through outer hopper 16. On the other hand, a portion 48b may be placed to fully occlude inner and outer hopper throat 16/18 so no feed can pass therethrough. Further, portion 48d may be provided to block feed through outer throat 16 while allowing feed to pass through inner throat 18.

FIG. 2 illustrates the use of horizontal control gate 54 in conjunction with passive feed chutes 20 and outer throat 16. These gates are set generally vertically in the feeder and control the generally horizontal and downward flow of particulate feed to one or more feed troughs. Some types of gates are known in the art, for example, see U.S. patent application Ser. No. 12/290,387, filed Oct. 30, 2008, and incorporated herein by reference. They comprise a sliding plate to adjustably set the opening between the bottom of the throat and passive feed chute 20. A horizontal control gate 54 operates on a specific passive feed chute 20. For example, if there are four passive feed chutes, then there will be typically four horizontal control gates 54 that may be independently adjusted by means known in the trade (for example, slots and fasteners engaging the slots as seen). Each horizontal control gate will selectively adjust, or shut off entirely, the fluid flow to each of the multiplicity of passive feed chutes 20. For example, there may be situations where the user wants feed to flow out of only three of the chutes and may shut off the fourth entirely.

Thus, flow control assembly 44 is provided to selectively control the flow of feed from the hoppers through the throats to the feeding mechanism, be it passive feed chute 20 and/or broadcast assembly 26.

Figure 3:
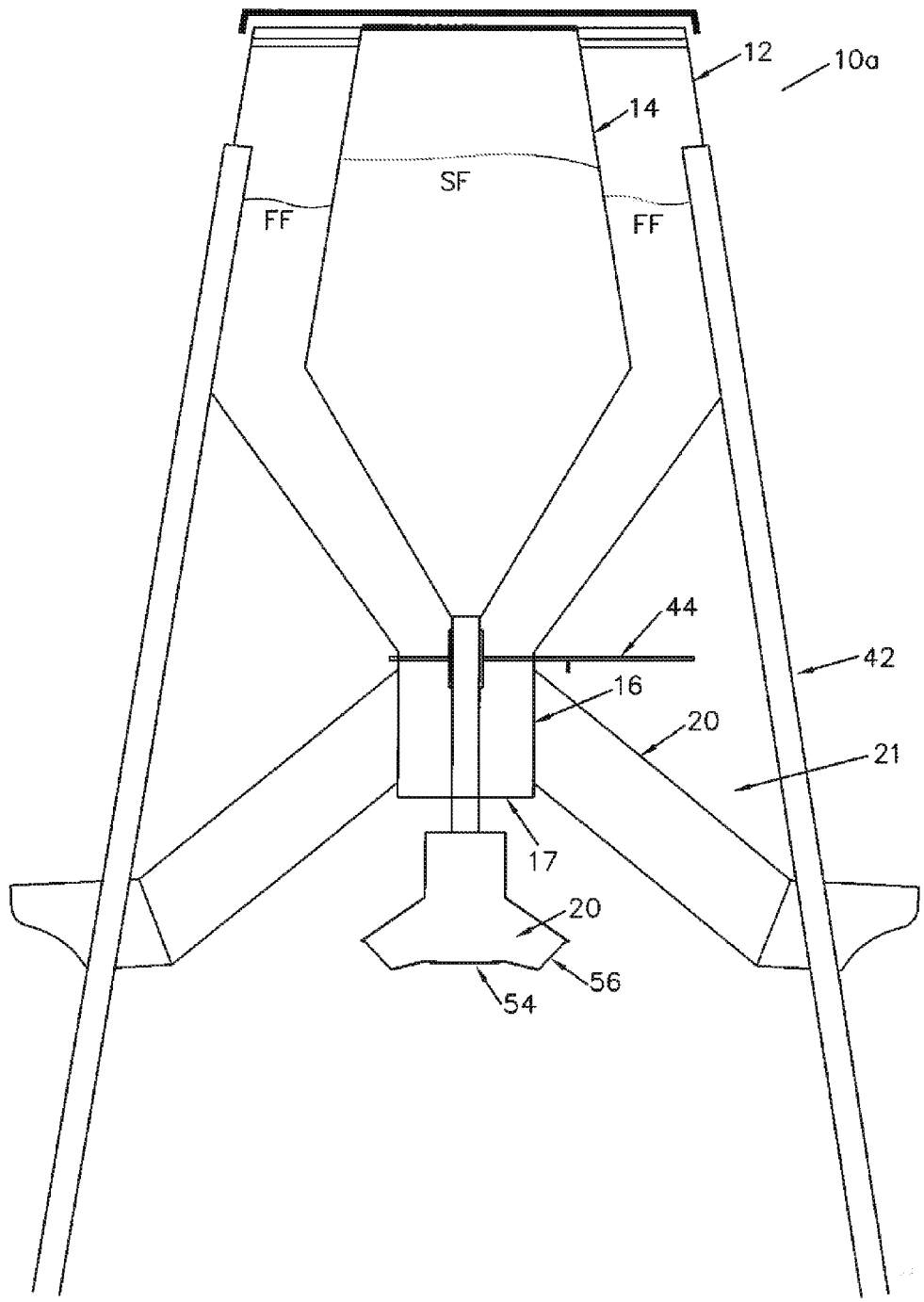

FIG. 3 illustrates a second embodiment of Applicant's animal feeder 10a which provides for the passive dispensing of a second feed SF, as well as a first feed FF, therefrom. That is to say, wherein the first embodiment had the passive dispensing of a first feed and active dispensing (from the broadcast assembly) of a second feed, separately, the second embodiment as illustrated in FIG. 3 has both feeds passively dispensing feed therefrom. More specifically, FIG. 3 illustrates the use of a second passive feed assembly 50 engaging the lower end of inner hopper throat 18 to receive a second feed SF therefrom. A second feed SF will flow out the removed open end of inner hopper throat 18 and, instead of being deposited on a spinner plate, will fall into a second passive feed assembly 50. Second passive feed assembly 50 comprises one or more passive feed chutes 20 with openings 56 at the removed end thereof. Moreover, a cleanout plate 54 may be located at the bottom end of second passive feed assembly 50 for cleanout purposes. As is seen in FIG. 3, the second passive feed assembly may be vertically spaced apart, for example, lower than first passive feed assembly 21.

Figure 3A:
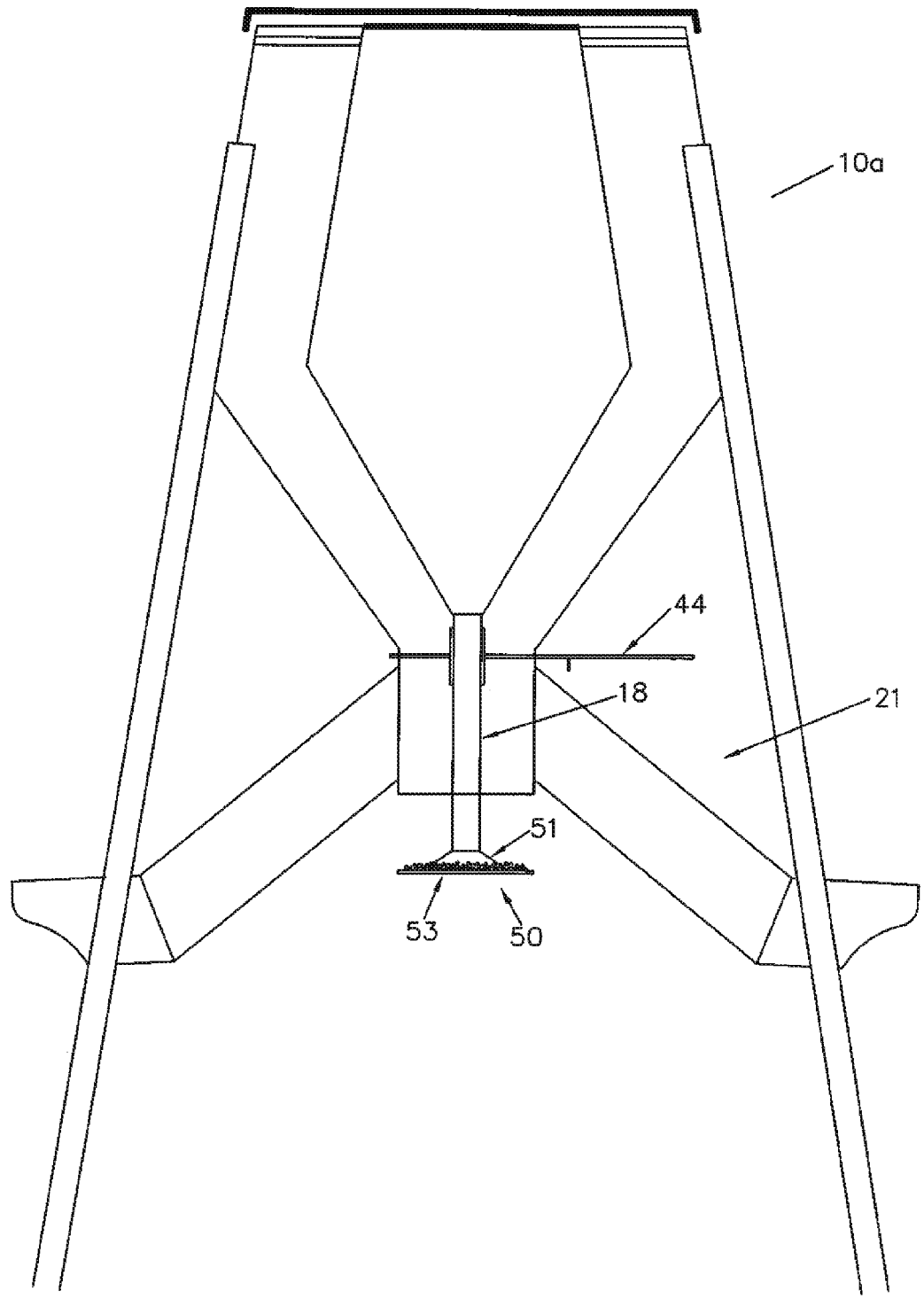
Figure 3C:
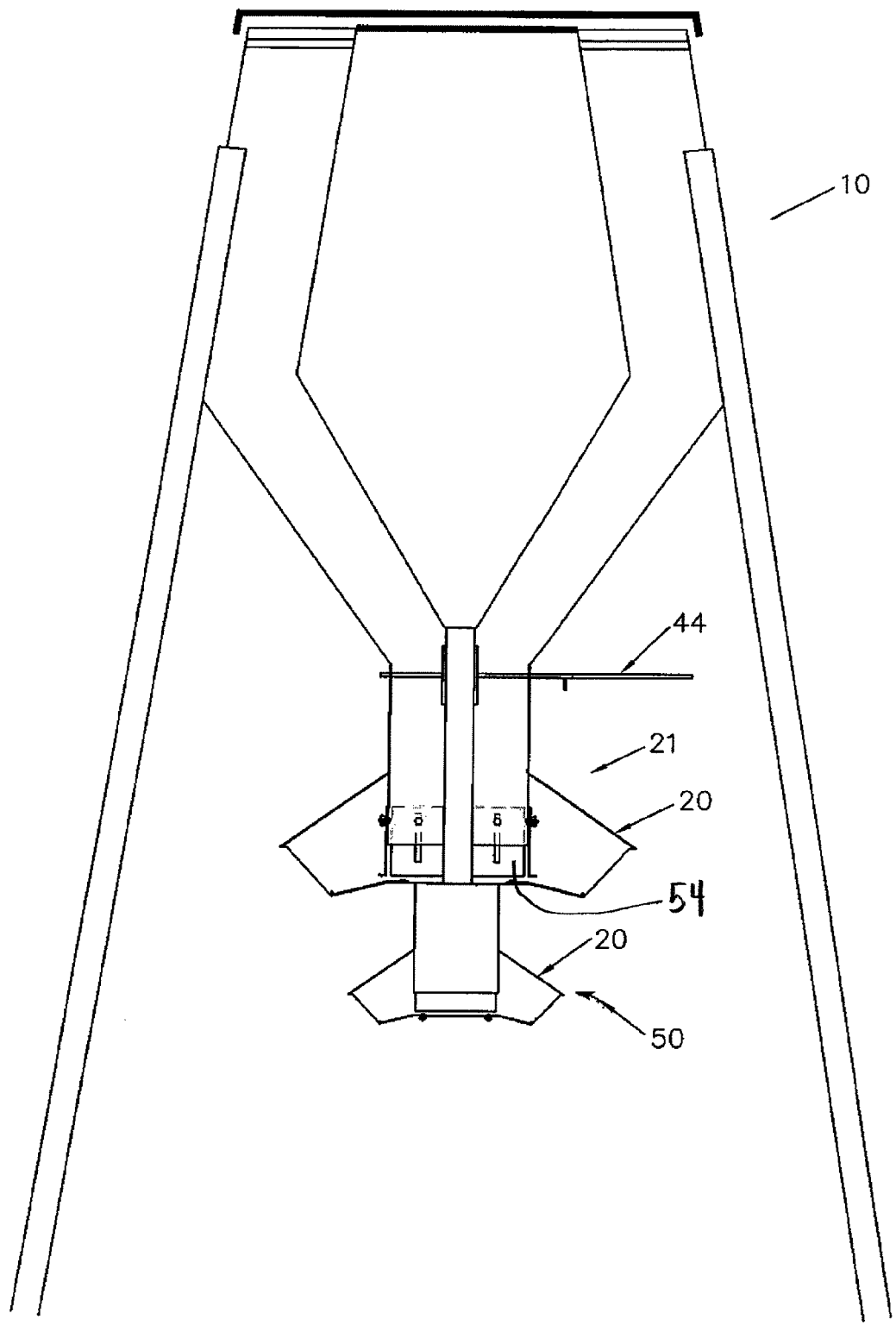

FIGS. 3A, 3B, and 3C illustrate several variations of Applicant's second embodiment 10a. In FIG. 3A, the second passive feed assembly 50 is comprised of a flat stationary plate 53 held on by several arms 51 extending below the bottom opening of inner throat 18. In FIG. 3B, the second passive feed assembly 50 is shown with a sliding horizontal flow control gate 54. Horizontal flow control gate 54 will slide up or down with respect to stationary compartment 57 located below the open end of throat 18. A fastener 58 engaging a blind nut welded to the inside of slideable gate 54 may be used to adjustably set opening 60 to allow more or less feed to flow into multiple mouths 56. FIG. 3C illustrates that the same sliding gate as illustrated in FIG. 3B may be used with first passive feed assembly 21. That is to say, a number of gate assemblies may be used at the junction of the passive feed chutes 20 and the throats or any lower member below the throats that are in fluid communication therewith. It is noted that these gates adjacent the passive feed chutes 20 may be used alone or in conjunction with flow control assemblies 44, which are typically located to impede vertical flow of feed through one or more throats. That is to say, gate assemblies may be constructed to both impede the vertical flow through the throat under the impetus of gravity and/or the substantially lateral flow of feed into passive feed chutes 20. All gates illustrated may be used with the passive/active embodiments of the invention or the passive/passive embodiments.

FIGS. 4A, 4B, and 4C illustrate the use of another variation of vertical flow gate or plate 48 wherein plate 48 is comprised of only a single flow control portion, here the portion 48d, as illustrated in FIG. 2. FIG. 4A illustrates this embodiment allowing the second feed to flow and closing off the first throat 16. Shifting the gate slightly to the right as illustrated in FIG. 4B will close the inner throat 18 for the inner hopper, but provide sufficient opening for the feed to pass through the outer throat 16. FIG. 4C illustrates the full open position wherein the plate is out of interference with both throats 16, 18 and both are fully open.

The device illustrated may be made from metal, such as 16 gauge sheet steel, plastic or any other suitable material.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. An animal feed device comprising:
    a first outer storage compartment having a first feed receiving opening and side walls wherein side walls of the first storage compartments include funnel shaped walls at a lower end thereof;
    a second inner storage compartment having a second feed receiving opening and side walls, wherein side walls of the second storage compartments include funnel shaped walls at a lower end thereof;
        wherein the second storage compartment is contained within the walls of the first storage compartment such that the first and second compartments are co-axially aligned;
    a first passive feed assembly in fluid communication with only the first storage compartment comprising an outer throat defined between the funnel shaped walls of the first compartment and the funnel shaped walls of the second compartment for providing fluid communication between the first storage compartment and a multiplicity of feed chutes;
    a feed dispensing means in fluid communication with only the second storage compartment comprising an inner throat defined by the funnel shaped walls of the second storage compartment for providing fluid communication between the second storage compartment and the feed dispensing means, wherein said feed dispensing means is a broadcast type dispenser
    a multiplicity of legs dimensioned to support the first storage compartments above a support surface such that the feed dispensing means and the multiplicity of feed chutes are located above the support surface;
    a first gate assembly for controlling the vertical flow of a first feed and a second feed, the first gate assembly comprising a plate movably arranged within a slot horizontally disposed through the inner and outer throat assemblies, said plate comprising a predetermined arrangement of openings corresponding to the openings defined by the inner and outer throats for controlling the vertical flow of at least the first feed from the first storage compartment to the passive feed assembly.

2. The animal feed device of claim 1, further including at least one lid for covering at least one of the feed receiving openings of the storage compartments.

3. The animal feed device of claim 1, further comprising a second gate assembly for controlling the substantially lateral flow of a first feed through the passive feed assembly.

* * * * *